US008025316B2

(12) United States Patent
Sperle et al.

(10) Patent No.: US 8,025,316 B2
(45) Date of Patent: Sep. 27, 2011

(54) DEVICE FOR CONNECTING A HIGH-PRESSURE LINE TO AN ACCUMULATOR TANK

(75) Inventors: Peter Sperle, Nykvarn (SE); Reijo Oilenius, Kungsör (SE)

(73) Assignee: Scania CV AB (Publ) (SE)

( * ) Notice: Subject to any disclaimer, the term of this patent is extended or adjusted under 35 U.S.C. 154(b) by 188 days.

(21) Appl. No.: 12/513,537

(22) PCT Filed: Oct. 23, 2007

(86) PCT No.: PCT/SE2007/050766

§ 371 (c)(1), (2), (4) Date: May 14, 2009

(87) PCT Pub. No.: WO2008/057030

PCT Pub. Date: May 15, 2008

(65) Prior Publication Data

US 2010/0059994 A1 Mar. 11, 2010

(30) Foreign Application Priority Data

Nov. 8, 2006 (SE) ....................................... 0602374

(51) Int. Cl.
*F16L 41/00* (2006.01)

(52) U.S. Cl. ......................... 285/197; 285/233; 285/234

(58) Field of Classification Search .................. 285/197, 285/198, 199, 231, 232, 233, 234
See application file for complete search history.

(56) References Cited

U.S. PATENT DOCUMENTS

| | | | | | |
|---|---|---|---|---|---|
| 1,116,146 | A * | 11/1914 | Smith | | 285/197 |
| 4,953,896 | A * | 9/1990 | Usui | | 285/197 |
| 5,143,410 | A | 9/1992 | Takiawa | | |
| 5,172,939 | A * | 12/1992 | Hashimoto | | 285/197 |
| 5,261,705 | A * | 11/1993 | Takahashi et al. | | 285/197 |
| 5,957,507 | A * | 9/1999 | Asada | | 285/197 |
| 6,050,611 | A * | 4/2000 | Asada | | 285/197 |
| 6,408,826 | B2 | 6/2002 | Asada et al. | | |
| 6,494,183 | B2 | 12/2002 | Usui et al. | | |
| 6,736,431 | B2 | 5/2004 | Jung et al. | | |
| 7,125,051 | B2 * | 10/2006 | Usui et al. | | 285/197 |

FOREIGN PATENT DOCUMENTS

| | | | |
|---|---|---|---|
| DE | 4030486 | A1 | 4/1991 |
| DE | 19927145 | A1 | 12/2000 |

(Continued)

OTHER PUBLICATIONS

International Search Report dated Feb. 8, 2008, issued in corresponding international application No. PCT/SE2007/050766.

*Primary Examiner* — David E Bochna
(74) *Attorney, Agent, or Firm* — Ostrolenk Faber LLP

(57) ABSTRACT

To connect a high-pressure line to a cylindrical accumulator tank, a fastener is fastened to one end of the high-pressure line, a connector has a first inside wall surface which defines a first hole for accommodating and fastening a portion of the cylindrical accumulator tank, a joining device effects a connection between the fastener and the connector, at the connection a contact surface of the high-pressure line is brought to engage with a contact surface of the accumulator tank. The first inside wall surface has in an axial direction relative to the cylindrical accumulator tank and a curved shape such that relative pivoting movements between the connector and the accumulator tank are enabled when the connection is effected and the contact surfaces are brought towards one another.

13 Claims, 3 Drawing Sheets

FOREIGN PATENT DOCUMENTS

| | | | |
|---|---|---|---|
| DE | 10143740 | A1 | 4/2003 |
| EP | 1045188 | A2 | 10/2000 |
| GB | 2239297 | A | 6/1991 |
| WO | WO 2006/010825 | A1 | 2/2006 |

* cited by examiner

DEVICE FOR CONNECTING A HIGH-PRESSURE LINE TO AN ACCUMULATOR TANK

CROSS REFERENCE TO RELATED APPLICATION

The present application is a 35 U.S.C. §§371 national phase conversion of PCT/SE2007/050766, filed Oct. 23, 2007, which claims priority of Swedish Application No. 0602374-1, filed Nov. 8, 2006, the disclosure of which is incorporated by reference herein. The PCT International Application was published in the English language.

BACKGROUND TO THE INVENTION, AND STATE OF THE ART

The present invention relates to a device for connecting a high-pressure line to an accumulator tank according to the preamble of claim 1.

One way of reducing discharges of emissions from diesel engines is to inject the fuel at very high pressure. A so-called “Common Rail” system is commonly used for effecting injection at a high pressure in the combustion spaces of a diesel engine. A Common Rail system comprises a high-pressure pump which pumps fuel at a very high pressure to an accumulator tank (“Common Rail”). The pressure in the accumulator tank during operation may be 350 bar or higher. The fuel in the accumulator tank is intended to be distributed to all the cylinders of the combustion engine. Fuel from the accumulator tank is injected into the combustion spaces of the respective cylinders by electronically controlled injection means. The fact that the pressure in the accumulator tank and in the high-pressure line which leads the fuel from the high-pressure fuel pump to the accumulator tank is so high imposes severe requirements upon the connection of the high-pressure line to the accumulator tank if it is to remain tight.

A known practice is to provide accumulator tanks with a permanent nozzle to make it possible to connect a high-pressure line, but providing an accumulator tank with a permanent nozzle involves a relatively large amount of work and is therefore expensive, since it has to be welded, forged or soldered firmly to the accumulator tank.

U.S. Pat. No. 6,408,826 refers to a device for connecting a high-pressure line to a cylindrical accumulator tank. The device comprises a connecting means which has a cylindrical hole so that it can be fastened to the accumulator tank. The connecting means also comprises a tubular threaded portion intended to cooperate with a nut in order to fasten an end of the high-pressure line to the accumulator tank. A problem with such a connection arises in cases where the cylindrical hole in the connecting means does not quite match the shape of the outside surface of the accumulator tank. This may result in the accumulator tank acquiring an undesirable oblique position relative to the tubular portion of the connecting means, resulting in the contact surfaces of the high-pressure line and of the accumulator tank assuming a corresponding oblique position when they are brought together. This may lead to play between said contact surfaces in an assembled state, with consequent leakage.

SUMMARY OF THE INVENTION

The object of the present invention is provide a device for connecting a high-pressure line to an accumulator tank whereby it is relatively easy to connect the high-pressure line to the accumulator tank and the risk of leakage between a contact surface of the high-pressure line and the contact surface of the accumulator tank is substantially totally eliminated.

The object indicated above is achieved with a device of the kind mentioned in the introduction which is characterised by the features indicated in the characterising part of claim 1. The inside wall surface of the connecting means which defines the hole for accommodating and fastening the cylindrical accumulator tank is thus given a shape which makes mutual pivoting movements possible between the connecting means and the accumulator tank. Making the joint between the fastening means and the connecting means involves moving the contact surface of the high-pressure line towards the contact surface of the accumulator tank. If at an initial stage the contact surfaces are positioned obliquely, the mobility defined above between the connecting means and the accumulator tank results in adjustment of the mutual positions of the contact surfaces until they assume an exactly mutual position, thereby ensuring that the contact surfaces will maintain a correct position relative to one another in a joined state. The pivoting movement between the connecting means and the accumulator tank which eliminates any obliqueness between the contact surfaces is effected when the contact surfaces are pressed against one another. Connecting the high-pressure line to the accumulator tank can thus be effected in a very simple manner. The risk of leakage due to obliquely positioned contact surfaces between the high-pressure line and the accumulator tank at the connection is therefore substantially totally eliminated.

According to an embodiment of the present invention, the first wall surface comprises a region situated at a minimum perpendicular distance from a first central axis which extends in an axial direction through the first hole. This means that a relatively limited region of the inside surface may be in contact with the outside surface of the accumulator tank. The result on both sides of this contact region is spaces between the inside surface of the hole and the outside surface of the accumulator tank. These spaces make mutual pivoting movements possible between the connecting means and the accumulator tank within an angular range defined by the shape of the inside wall surface. With advantage, said plane has a perpendicular extent relative to the first central axis. Said region of the inside wall surface therefore has a substantially annular region curving inwards which is in contact with the outside surface of the accumulator tank. With advantage, said plane has a position such that it has a second central axis extending in an axial direction through the second hole. Such a plane extends centrally through the contact surface of the high-pressure line and the contact surface of the accumulator tank. This makes equivalent pivoting movements of the connecting means possible relative to the accumulator tank on both sides of said plane.

According to another embodiment of the present invention, said first inside wall surface has a curved shape in said axial direction with the result that the perpendicular distance of the wall surface from said first central axis increases continuously with distance from the plane A. This is necessary if pivoting movements of the connecting means relative to the accumulator tank are to be possible within a relatively large angular range. Such an angular range may be of the order of a couple of degrees. With advantage, said first inside wall surface has a curved shape in said axial direction so that its gradient increases continuously relative to said first central axis with distance from the plane A. Stable positioning of the connecting means relative to the accumulator tank is thus facilitated at various angles within an angular range.

According to another embodiment of the present invention, said contact surfaces have a shape which makes centreing of the contact surfaces possible when they are brought towards one another. The contact surfaces have with advantage a corresponding shape so that they are guided to an optimum mutual position when they are brought towards one another. Such a centreing process may involve the connecting means being moved slightly in an axial direction relative to the accumulator tank so that the connecting means is rotated slightly about the accumulator tank and the connection piece pivots a little relative to the accumulator tank. Adjustment of the contact surfaces can thus be effected in all dimensions so that optimum contact and tightness between the contact surfaces can at all times be ensured. Said contact surfaces are preferably substantially conical in shape.

According to another embodiment of the present invention, said fastening means comprises cooperating threads adapted to effecting a threaded connection between the fastening means and the connecting means, thus making it possible for the contact surfaces to be brought towards one another in a linear movement. A threaded connection also makes possible a connection in which the contact surfaces are held together with great force. Said cooperating threads may comprise an internal or external thread on the fastening means which is adapted to cooperating with an opposite internal or external thread of the connecting means. In the one case the fastening means in the form of a nutlike element with internal threads may be screwed firmly onto a tubular portion of the connecting means with external threads. Alternatively, the fastening means in the form of a nutlike element with external threads may be screwed firmly into a tubular portion of the connecting means with internal threads.

BRIEF DESCRIPTION OF THE DRAWINGS

Preferred embodiments of the present invention are described below by way of examples, with reference to the attached drawings, in which.

DETAILED DESCRIPTION OF PREFERRED EMBODIMENTS OF THE INVENTION

Figure 1:
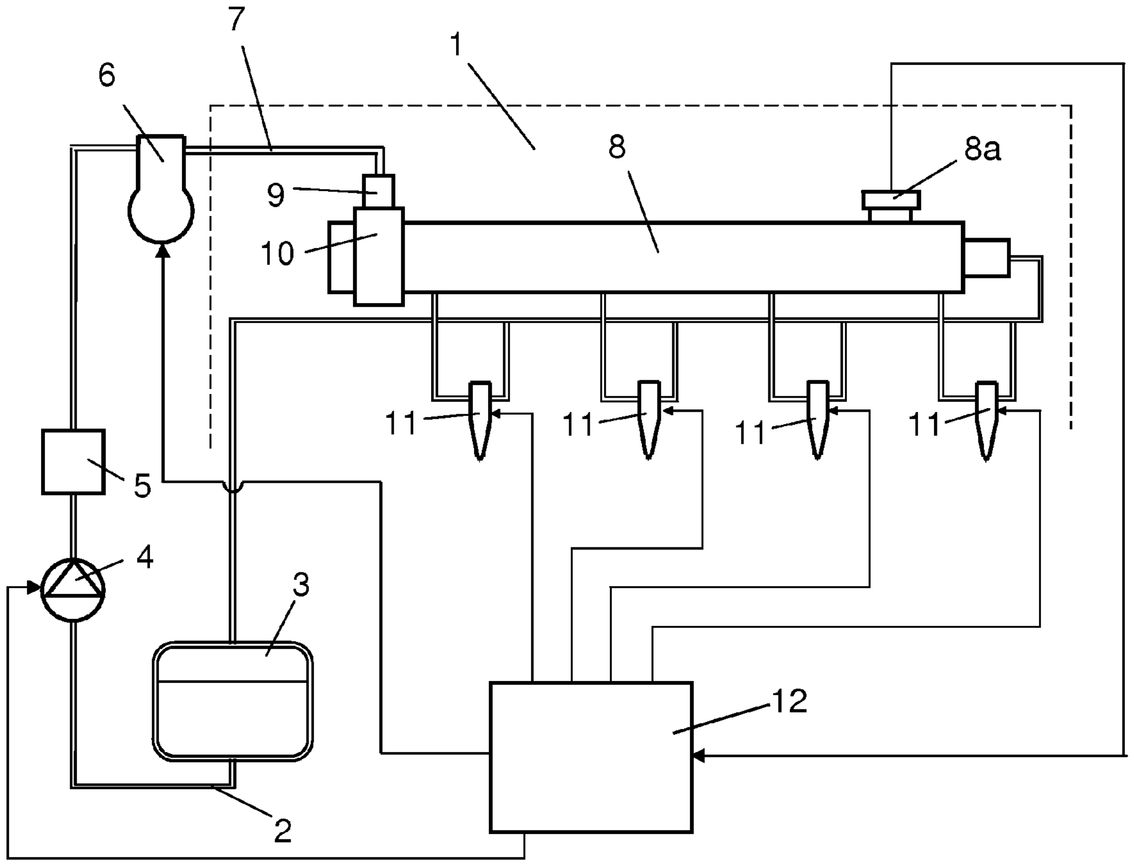
FIG. 1 depicts an injection system with a device according to the present invention and FIG. 2 depicts a first embodiment of a device according to the present invention and FIG. 3 depicts a second embodiment of a device according to the present invention.

FIG. 1 depicts an injection system for injecting fuel at a very high pressure in a combustion engine here exemplified as a diesel engine 1. Injecting the fuel at a very high pressure may reduce discharges of emissions from the diesel engine 1. The injection system and the diesel engine 1 may be fitted in a heavy vehicle. The injection system comprises a fuel line 2 for supplying fuel from a fuel tank 3 to the respective cylinders of the diesel engine 1. A first fuel pump 4 is arranged in the fuel line 2 to transfer fuel from the fuel tank 3 to a high-pressure tank 6 via a filter 5. The high-pressure pump 6 is adapted to giving the fuel a very high pressure. The pressurised fuel is led via a high-pressure line 7 to an accumulator tank 8 in the form of a so-called Common Rail. The high-pressure line 7 is connected to the accumulator tank 8 by a device which comprises fastening means 9 and connecting means 10 which are connectable to one another. The fuel from the accumulator tank 8 is injected into the respective cylinders of the diesel engine 1 by injection means 11. An electrical control unit 12 is intended to control the operation of the fuel pump 4, the high-pressure pump 6 and the injection means 11. The electrical control unit 12 may take the form of a computer unit provided with suitable software for effecting such control. A pressure sensor 8*a* is fitted in the accumulator tank 8 to detect the prevailing pressure therein and send a signal to the control unit 12 conveying information about pressure values detected. On the basis inter alia of that information the control unit 12 can control the injection means 11 so that they inject an optimum amount of fuel at an optimum time into the respective cylinders of the diesel engine 1.

Figure 2:
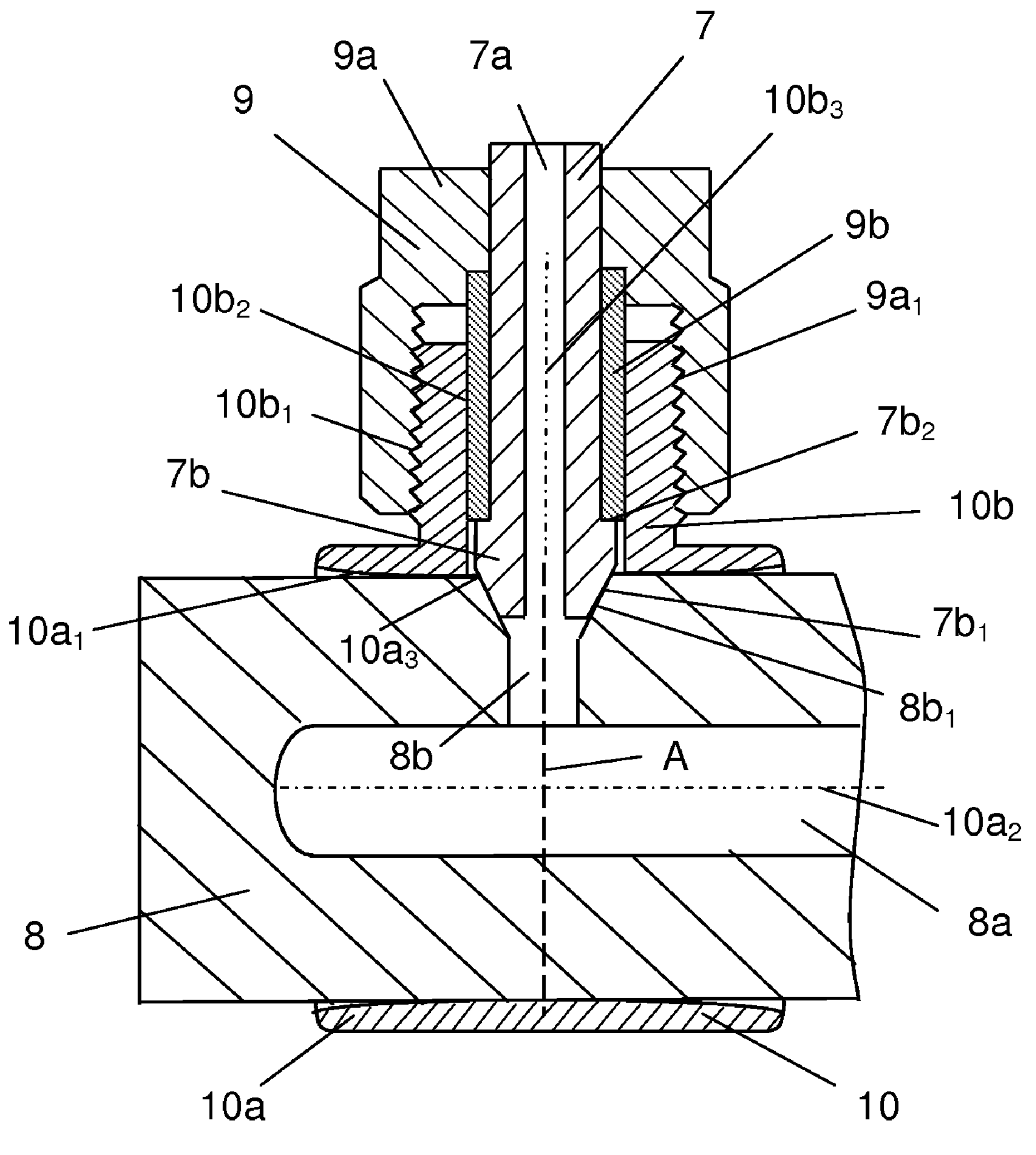

FIG. 2 depicts an embodiment of the fastening means 9 and a connecting means 10 for connecting the high-pressure line 7 to the accumulator tank 8. The high-pressure line 7 comprises a duct 7*a* for transfer of fuel. The high-pressure line 7 has an end portion 7*b* where the duct 7*a* has an outlet aperture. The end portion 7*b* has a conically shaped contact surface $\mathbf{7}b_1$ situated adjacent to the outlet aperture. The contact surface $\mathbf{7}b_1$ is adapted to being pressed against a correspondingly shaped conical contact surface $\mathbf{8}b_1$ of an inlet duct 8*b* in the accumulator tank 8 in an assembled state. The inlet duct 8*b* is connected to an internal space 8*a* of the accumulator tank in order to receive fuel. The device comprises a fastening means 9 comprising a nut 9*a*. The nut 9*a* has a recess provided with an internal thread $\mathbf{9}a_1$. A pressure transfer sleeve 9*b* provides a connection between the nut 9*a* and a pressure surface $\mathbf{7}b_2$ of the end portion 7*b* of the high-pressure line. The device comprises a connecting means 10 comprising a first tubular portion 10*a* with an internal surface $\mathbf{10}a_1$ which defines a first through-hole. The first hole is dimensioned to accommodate the accumulator tank 8. A first axis $\mathbf{10}a_2$ has a central extent in the first hole. The connecting means 10 comprises a second tubular portion 10*b* provided with an external thread $\mathbf{10}b_1$. The second tubular portion 10*b* has a second internal surface $\mathbf{10}b_2$ which defines a second hole. The second hole is dimensioned to accommodate the high-pressure line 7 and the pressure transfer sleeve 9*b*. A second axis $\mathbf{10}b_3$ has a central extent in the second hole. The first tubular portion 10*a* has an aperture $\mathbf{10}a_3$ connecting the first hole and the second hole in the connecting means 10. The inside wall surface $\mathbf{10}a_1$ of the first hole has a slightly curved shape in an axial direction. The first inside wall surface $\mathbf{10}a_1$ is therefore situated in an axial direction at a varying perpendicular distance from the first axis $\mathbf{10}a_2$. The first inside wall surface 10*a* is situated at a minimum perpendicular distance from the first axis $\mathbf{10}a_2$ in a plane A which has a perpendicular extent relative to the first axis $\mathbf{10}a_2$. The plane A has a position such that it comprises the second axis $\mathbf{10}b_3$. The first inside wall surface $\mathbf{10}a_1$ has a curved shape in an axial direction so that the perpendicular distance of the wall surface $\mathbf{10}a_1$ from said first axis $\mathbf{10}a_2$ increases continuously with distance from the plane A. The first inside wall surface $\mathbf{10}a_1$ also has a curved shape in an axial direction so that its gradient increases continuously relative to said first axis $\mathbf{10}a_2$ with distance from the plane A.

The first step in connecting the high-pressure line 7 to an accumulator tank 8 is to apply the first tubular portion 10*a* of the connecting means to the cylindrical accumulator tank 8. The connecting means 10 is brought to a position on the accumulator tank 8 in which the aperture $\mathbf{10}a_3$ of the connecting means is situated substantially radially externally to the inlet duct 8*b* of the accumulator tank. The connecting means 10 may be brought to this position by axial movements and rotary movements relative to the accumulator tank 8. The high-pressure line 7 is thus provided with a fastening means 9 in the form of a nut 9*a* and a pressure sleeve 9*b*. The end portion 7*b* of the high-pressure line is inserted in the hole in the second tubular portion 10*b*. The internal thread $\mathbf{9}a_1$ of the nut thus comes into contact with the external thread $\mathbf{10}b_1$ of the second tubular portion. The nut 9*a* is thereafter screwed onto the second tubular portion 10*b*. The nut 9*a* is thus subjected to a movement which is converted, via pressure sleeve 9*b* and the pressure surface $7b_2$, to a linear movement of the end portion 7*b* of the high-pressure line. The end portion 7*b* of the high-pressure line is thereby moved in through the aperture $10a_3$ of the connecting means and into the inlet duct 8*b* of the accumulator tank. The screwing movement of the nut 9*a* continues until the conically shaped surface $7b_1$ of the end portion comes into contact with the corresponding conically shaped surface $8b_1$ of the inlet duct. The nut 9*a* is tightened so that said conically shaped surfaces $7b_1$, $8b_1$ are pressed together with a predetermined force.

When the conically shaped surface $7b_1$ of the high-pressure line is pressed against the conically shaped surface $8b_1$ of the accumulator tank, the connecting means 10 may be subjected to a corrective axial movement and a corrective rotary movement if it is not already in an exact position relative to the accumulator tank 8. The fact that the connecting means 10 according to the present invention is connected to the accumulator tank 8 via said curved first inside surface $10a_1$ means that the connecting means 10 and the accumulator tank 8 may also be subjected to pivoting movements relative to one another within a restricted range. As the curvature of the first inside surface $10a_1$ increases continually with distance from said plane A, the connecting means 10 and the accumulator tank 8 may be subjected to pivoting movements to substantially any desired mutual angular positions within the limited range. The connecting means 10 and the accumulator tank 8 may thus be positioned obliquely relative to one another. If the conically shaped contact surfaces $7b_1$, $8b_1$ have a certain initial obliqueness during the connecting movement, pressure forces acting between the contact surfaces $7b_1$, $8b_1$ may be used to provide a pivoting movement of the connecting means 10 relative to the accumulator tank 8. The connecting means 10 is thereby subjected to a pivoting movement relative to the accumulator tank 8 until the contact surfaces $7b_1$, $8b_1$ reach a correct mutual position. It is therefore substantially always possible to bring the contact surfaces $7b_1$, $8b_1$ together in such a way that they abut against one another without any obliqueness. There is thus assurance of a tight connection between the high-pressure line 7 and the accumulator tank 8.

Figure 3:
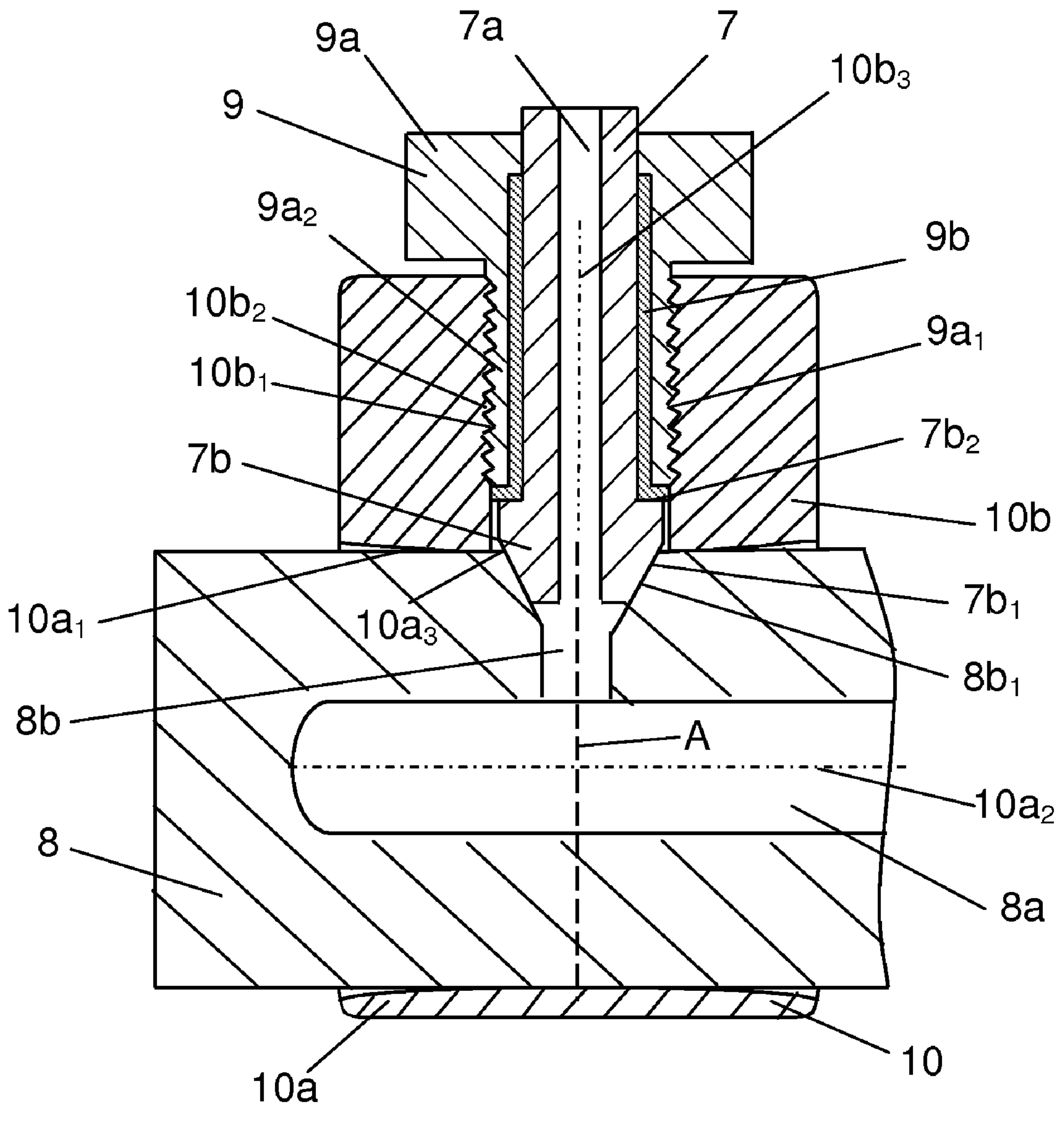

FIG. 3 depicts an alternative embodiment of a device for connecting a high-pressure line to an accumulator tank 8. A device comprises the connecting means 10 which here again has a first tubular portion 10*a* with a first inside wall surface 10*a* which defines a hole for accommodating an accumulator tank 8. The first inside wall surface 10*a* has in an axial direction a curved shape corresponding to that in FIG. 2. This likewise here allows the possibility between the connecting means 10 and the accumulator tank 8 of relative pivoting movements which can be used for compensating any initial obliqueness between the contact surface $7b_1$ of the high-pressure line and the contact surface $8b_1$ of the accumulator tank during the movement which presses them together. Here again there is assurance of good tightness in the connection between the high-pressure line 7 and the accumulator tank 8. In this case, however, the connecting means 10 is provided with a second tubular portion 10*b* which has an internal thread $10b_1$. In this case the internal thread $10b_1$ forms part of the inside surface $10b_2$ which defines the second hole in the connecting means. The nut 9*a* is here provided with a protruding portion $9a_2$ which has an external thread $9a_1$ adapted to cooperating with an internal thread $10b_1$ of the second tubular portion 10*b*. A pressure-generating sleeve 9*b* here again converts the movement of the nut 9*a* to a linear movement of the end portion 7*b* of the high-pressure line via a pressure surface $7b_2$.

The invention is in no way limited to the embodiment to which the drawings refer but may be varied freely within the scopes of the claims. A cylindrical accumulator tank 8 need not necessarily have a circular cross-section but may have substantially any desired cross-sectional shape. The hole in the first tubular portion 10*a* which accommodates the accumulator tank 8 therefore likewise need not have a circular cross-sectional shape.

The invention claimed is:

1. A device for connecting a high-pressure line to a cylindrical accumulator tank, the device comprising:

a fastener fastened to the high-pressure line, a connector having a first part with a first inside wall surface which defines a first hole for accommodating and fastening a portion of the cylindrical accumulator tank, the connector having a second protruding part extending outward from the cylindrical tank, the protruding part having a second internal surface, which defines a second hole extending outward from the tank for accommodating and fastening an end of the high-pressure line, a joining device operable to form a connection between the fastener and the connector, a first contact surface of the high-pressure line operable to engage a second contact surface of the accumulator tank, in an axial direction relative to the cylindrical accumulator tank, the first inside wall surface of the connector has a shape that enables relative pivoting movements between the connector and the accumulator tank when they are joined and the first and second contact surfaces are brought towards one another by the fastener acting on the connector, the first inside wall surface including a first region situated at a minimum perpendicular distance from a first central axis which extends in an axial direction through the first hole, and a second region situated at some greater perpendicular distance from the first central axis.

2. A device according to claim 1, wherein the first wall surface region is in a plane which has a perpendicular extent relative to the first central axis.

3. A device according to claim 2, wherein the plane is positioned such that a second axis lying in the plane extends in an axial direction through the second hole.

4. A device according to claim 2, wherein the first inside wall surface has a curved shape in the axial direction so that the perpendicular distance of the wall surface from said first central axis increases continuously with distance from the plane.

5. A device according to claim 4, wherein the first inside wall surface has a curved shape in the axial direction so that its gradient increases continually relative to the first central axis with distance from the plane.

6. A device according to claim 2, wherein the first inside wall surface is shaped such that in the axial direction, its gradient increases continually relative to the first central axis with distance from the plane.

7. A device according to claim 1, wherein the first and second contact surfaces are respectively shaped and configured to enable centering of the contact surfaces when they are brought towards one another.

8. The contact surface 7, wherein the first and second contact surfaces have respective complementary and respective substantially conical shapes.

9. A device according to claim 1, wherein the joining device comprises cooperating threads which effect a threaded connection between the fastener and the connector.

10. A device according to claim 9, wherein the cooperating threads comprise one of an internally or externally arranged thread of the fastener which is operable to cooperate with an opposite internal or external thread of the connector.

11. A device according to claim 1, wherein the high pressure line has another end at which the fastener is positioned.

12. A device according to claim 11, wherein the fastener is operable to act on the connector to urge the first and second contact surfaces together.

13. A device according to claim 1, wherein the connection is generally at the contact surfaces.

* * * * *